US006839790B2

United States Patent
Barros De Almeida et al.

(10) Patent No.: US 6,839,790 B2
(45) Date of Patent: Jan. 4, 2005

(54) PLUG AND PLAY RECONFIGURABLE USB INTERFACE FOR INDUSTRIAL FIELDBUS NETWORK ACCESS

(75) Inventors: Marcelo Barros De Almeida, Sertaozinho (BR); Rogerio Santiago Ribeiro, Sertaozinho (BR); Delcio Prizon, Sertaozinho (BR)

(73) Assignee: SMAR Research Corporation, Holbrook, NY (US)

( * ) Notice: Subject to any disclaimer, the term of this patent is extended or adjusted under 35 U.S.C. 154(b) by 111 days.

(21) Appl. No.: 10/176,856

(22) Filed: Jun. 21, 2002

(65) Prior Publication Data

US 2003/0236937 A1 Dec. 25, 2003

(51) Int. Cl.[7] .............................................. G06F 13/00
(52) U.S. Cl. ..................................... 710/305; 713/300
(58) Field of Search ......................... 710/305; 709/223, 709/224; 713/300, 320; 370/252, 254

(56) References Cited

U.S. PATENT DOCUMENTS

| | | | | |
|---|---|---|---|---|
| 5,349,685 | A | * | 9/1994 | Houlberg ..................... 712/40 |
| 5,671,355 | A | * | 9/1997 | Collins ....................... 709/250 |
| 5,699,350 | A | | 12/1997 | Kraslavsky |
| 5,801,942 | A | | 9/1998 | Nixon et al. |
| 5,923,557 | A | | 7/1999 | Eidson |
| 6,262,596 | B1 | * | 7/2001 | Schultz et al. ............... 326/41 |
| 6,266,726 | B1 | | 7/2001 | Nixon et al. |
| 6,269,252 | B1 | | 7/2001 | Hutchings et al. |
| 6,463,078 | B1 | | 10/2002 | Engstrom et al. |
| 6,504,851 | B1 | | 1/2003 | Abler et al. |
| 6,546,450 | B1 | * | 4/2003 | Liu ............................. 710/316 |
| 6,601,124 | B1 | * | 7/2003 | Blair .......................... 710/305 |
| 2002/0018487 | A1 | | 2/2002 | Chen et al. |

OTHER PUBLICATIONS

Profibus Nutzerorganisation e.V., Profibus Technical Description [online—retrieved on Mar. 21, 2002], Sept. 1999.
http://www.fieldbus.org/about/Foundationtech.html [online—retrieved on Mar. 21, 2002], Fieldbus Foundation, 2001.
http://www.hartcomm.org/hcf/overview.html [online—retrieved on Mar. 22, 2002] HART Communication Foundation, 2001.

* cited by examiner

Primary Examiner—Xuan M. Thai
(74) Attorney, Agent, or Firm—Kenyon & Kenyon (57) ABSTRACT

A reconfigurable interface device for providing access to a plurality of fieldbus networks. The interface device includes a reconfigurable circuit which provides access to a selected fieldbus network from among several optional fieldbus networks. According to an embodiment, the reconfigurable circuit includes a plurality of media units, each media unit providing access to one of the several optional fieldbus networks, and a switch unit coupled to each of the plurality of media units, the switch unit activating a media unit corresponding to the selected fieldbus network, and deactivating remaining media units. A reconfigurable control device is provided for controlling and monitoring a plurality of fieldbus networks. The control device includes a host, having a server and non-volatile memory, and a reconfigurable interface device having a reconfigurable circuit. The non-volatile memory stores firmwares for reconfiguring the reconfigurable circuit in accordance with each of the several optional fieldbus networks.

35 Claims, 4 Drawing Sheets

PLUG AND PLAY RECONFIGURABLE USB INTERFACE FOR INDUSTRIAL FIELDBUS NETWORK ACCESS

FIELD OF THE INVENTION

The present invention relates to industrial process control and monitoring systems. More particularly, the present invention relates to a plug and play USB interface that can be reconfigured to provide access to several fieldbus networks that operate using different communication protocols.

BACKGROUND INFORMATION

Industrial process control systems are widely applied in industrial plants, factories, and other field sites where they are used to coordinate and automate multiple operations such as sensing, monitoring, communication and device actuation. In these control systems, control devices both control and monitor spatially distributed field devices such as sensors, valves, and switches by communicating messages and data with these devices over specialized fieldbus networks using communication protocols particular to each type of fieldbus network. Within a given fieldbus network, the control devices and the field devices are typically configured to communicate with and respond to a single fieldbus protocol corresponding to the particular network.

The control devices may be implemented as microprocessor-based controllers, computers or workstations that control processes by communicating control commands to the fieldbus devices. The control commands may be implemented as software, and can be adapted or modified without affecting any of the hardware of the process control system. For example, a process engineer working from a workstation computer might develop a program routine that causes a control device to request a measurement of a fluid level at a level sensor field device, compare the measured level with a pre-defined threshold level, and then actuate a feed valve based on whether the measured level is above or below the pre-defined threshold. The threshold level may be pre-set or modified by the process engineer through a software application running on the workstation. To accomplish this high level of control and flexibility, it is crucial that software commands at the workstation be correctly adapted for the appropriate fieldbus network and protocol to which the control device and level sensor are coupled.

Currently, there are three predominant fieldbus network platforms: Foundation fieldbus, Profibus and the Hart network. Historically, each of these fieldbus network platforms was developed at slightly different times and designed for somewhat different functionality. Consequently, extensive investment and infrastructure has been allocated to each of the three dominant platforms, with the result that many process control systems and industrial sites include a combination of fieldbus network platforms. While each of the fieldbus networks generally use twisted-pair cables, their respective physical layers are not identical, and their respective transaction mechanisms (e.g., master/slave, multi-master/multi-slave) are quite distinct from one another. To integrate control operations at such a site, the control devices need to be able to interface with and communicate over the various pre-installed fieldbus networks at the site using the appropriate protocol.

While there are several single-network interfaces available which allow an operator to connect a control device to a Foundation Fieldbus network or a Profibus network, for example, using a Serial bus or a PCMCIA connection, such interfaces do not offer the ability to adaptively change connectivity between different fieldbus platforms. Accordingly, when an operator wishes to access different fieldbus networks, the interface must be manually switched. Protocol gateways or mapping devices have also been proposed, which translate messages from one protocol or device description language into another. For example, U.S. Pat. No. 5,923,557 to Eidson describes a mapper device that translates instructions from an application program into multiple fieldbus protocols at a fieldbus network interface. However, in the system described, a separate mapper is required for each of the multiple fieldbus networks to which an interface is desired, making this a somewhat cumbersome solution for generalized access to fieldbus networks.

What is therefore needed is a single standard interface that can be used to provide access to the most prevalent existing fieldbus networks from any common workstation, server, personal digital assistant, programmable controller, or similar microprocessor-based control device.

SUMMARY OF THE INVENTION

To meet the aforementioned need, the present invention provides a reconfigurable interface device for providing access to a plurality of fieldbus networks that includes a reconfigurable circuit, which is reconfigurable to provide access to a selected fieldbus network from among several optional fieldbus networks.

According to an embodiment of the present invention, the reconfigurable circuit includes a plurality of media units, each media unit providing access to one of the several optional fieldbus networks, and a switch unit coupled to each of the plurality of media units, which activates the media unit corresponding to the selected fieldbus network, and deactivates the remaining, unselected media units.

According to a further embodiment, the reconfigurable circuit includes a Hart media unit, a Profibus media unit and a Foundation fieldbus media unit.

The present invention also provides a plug-and-play reconfigurable interface device for providing an interface between a host control device and a plurality of fieldbus networks that includes a reconfigurable circuit which is reconfigurable to provide access to a selected fieldbus network from among several optional fieldbus networks. The reconfigurable circuit includes a plurality of media units, each of which provide access to one of the several optional fieldbus networks, and a switch unit coupled to each of the plurality of media units for activating a media unit corresponding to the selected fieldbus network and deactivating remaining media units. The reconfigurable circuit also includes a microprocessor switchably coupled to the plurality of media units, which is adapted to receive firmware from the host control device having instructions for reconfiguring the microprocessor to enable communication over the selected fieldbus network.

The present invention also provides a reconfigurable USB interface for providing access to a plurality of fieldbus networks including a reconfigurable circuit that is reconfigurable to provide access to a selected fieldbus network from among several optional fieldbus networks, and a USB port which receives selection and control information over a USB bus and provides the selection and control information to the reconfigurable circuit.

The present invention further provides a reconfigurable control device for controlling and monitoring a plurality of fieldbus networks including a host, having a server and non-volatile memory, and a reconfigurable interface device coupled to the host for providing access to a plurality of fieldbus networks. The interface device includes a reconfigurable circuit for providing access to a fieldbus network selected by the host from among several optional fieldbus networks. The non-volatile memory stores firmwares for reconfiguring the reconfigurable circuit in accordance with each of the several optional fieldbus networks.

The present invention further provides a reconfigurable system for controlling and monitoring a fieldbus network including a client device having a microprocessor that executes application software for selecting a fieldbus network for control and monitoring operations, a host including a server and non-volatile memory, that provides an application program interface to the client device and communicating instructions and data to the client through the application program interface. The system further includes a reconfigurable interface device coupled to the host that provides access to a plurality of fieldbus networks, the interface device being reconfigurable to provide access to the selected fieldbus network from among several optional fieldbus networks.

The present invention further provides a method for enabling communication with field devices on a selected fieldbus network using a reconfigurable interface device. According to an embodiment, a fieldbus network is selected from among several optional fieldbus networks for communication and an interface device is reconfigured to provide access to the selected fieldbus network.

The present invention further provides a computer-readable medium for storing instructions for causing an interface device to fieldbus networks to reconfigure to provide access to a selected fieldbus network and to communicate with field devices on the selected fieldbus network.

DETAILED DESCRIPTION

The term "client" as used herein means a computer, workstation, programmable controller or other device having processing capability, which is adapted to execute a process control application (application program) on a Windows™, Unix, PALM, VxWorks or other operating system and to communicate with a host using an application program interface (API). The client may communicate with the host remotely over a distributed network such as the Internet, or by a direct local area network (LAN) connection.

The term "host" as used herein means a computer, workstation, programmable controller or other device having processing capability that includes a server program and downloadable firmware.

The term "server" as used herein means a program run at a host that is adapted to provide application program interfaces for a client process control application, and further adapted to provide downloaded firmware to an interface device.

Figure 1:
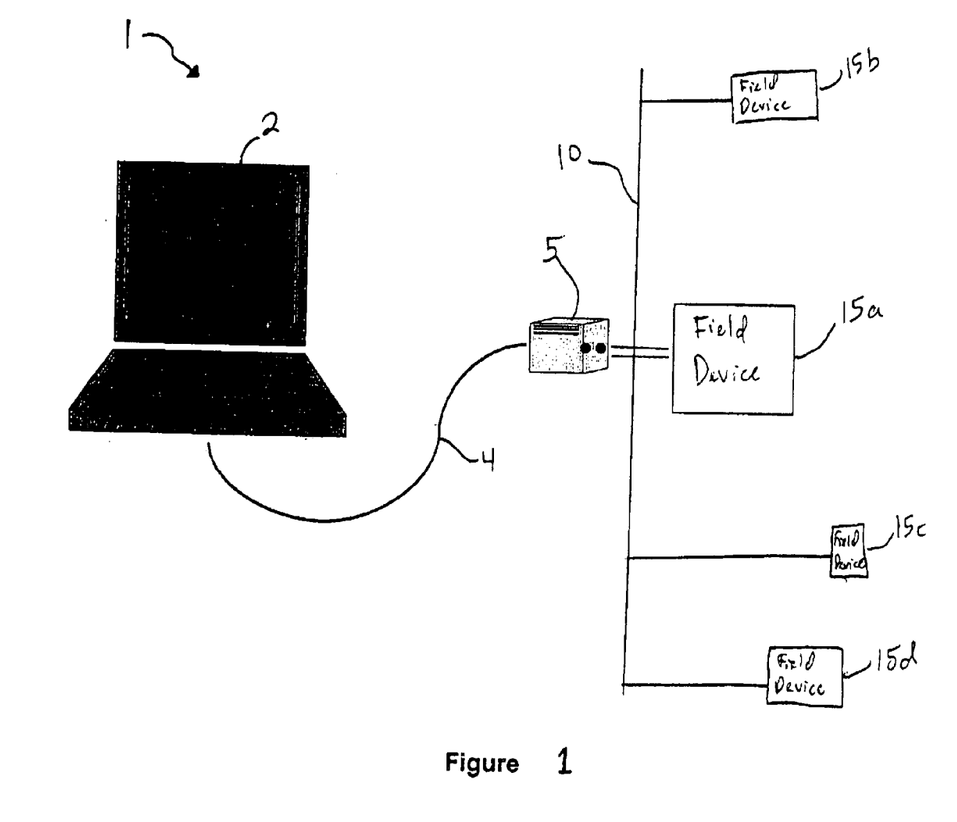
FIG. 1 illustrates an exemplary fieldbus network interface assembly in which an interface device according to the present invention connects a host control device to a fieldbus network.

FIG. 1 shows an exemplary fieldbus network interface assembly according to an embodiment of the present invention. As shown, the fieldbus network interface assembly 1 includes a host 2 having a Universal Serial Bus (USB) port that is connected via a USB bus 4 to an interface device 5. The interface device 5 provides a direct communication interface between the host 2 and a fieldbus network 10 through which the host can send commands to and receive data from field devices such as 15a, b, c, d. The interface device 5 is reconfigurable to provide an interface to the fieldbus network 10 regardless of the type of fieldbus network, e.g. Foundation Fieldbus, Profibus, Hart network etc. for which a host connection is desired. Thus, the host 2 can be relocated to different parts of a distributed process control system, and be operatively reconnected to whichever fieldbus network is locally installed via the reconfigurable interface device 5.

Figure 2:
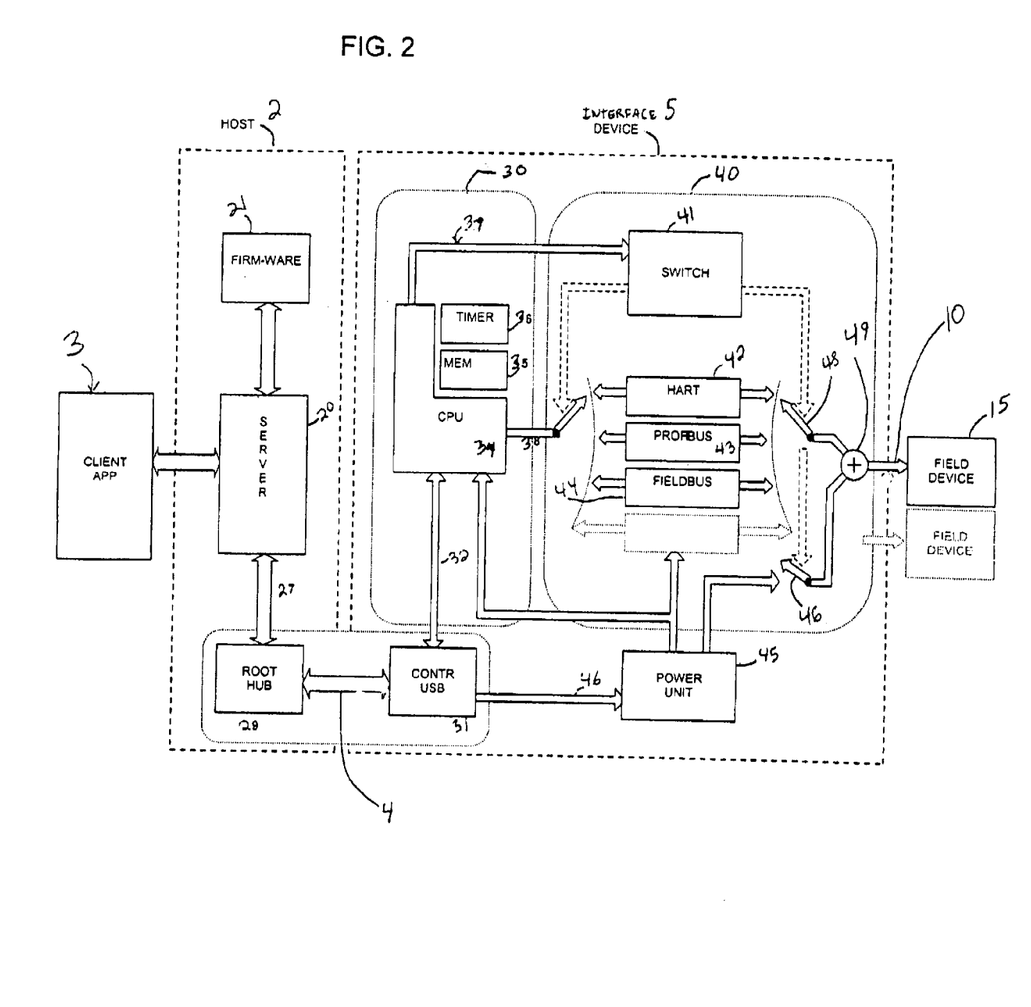
FIG. 2 is a schematic block diagram showing the functional components of the host control device and the reconfigurable interface device according to an embodiment of the present invention.

FIG. 2 is a schematic block diagram showing the functional components of the host control device and the interface device according to an embodiment of the present invention. As shown, a client application 3 running at a client communicates with a host 2 by a remote or local network connection. The host 2 includes a server 20, which communicates directly with the client application 3 via an application programming interface, and a downloadable firmware database 21, which may be implemented in a hard disk drive, for example. As will be discussed further below, the firmware database 21 includes information for reconfiguring a processing component of the interface device 5 to accommodate a particular fieldbus protocol according to instructions received from the client 3. According to one implementation, as shown in FIG. 1, the host 2 may also include a USB root hub 29 that includes the physical layer of a USB network and provides the main hub for connection of the USB network to the host. The server 20 communicates with the USB hub 29 via an interface that may be implemented as an application program interface at the operating system level. However, the USB hub 29 can be also implemented as a separate module that may be coupled to the host 2 via a USB port.

The USB hub 29 is connected via a USB bus 4 to a USB controller 31 which contains electronic components for communicating and processing USB data frames. According to the depicted embodiment, the USB controller 31 is included within the interface device 5. However, as noted above with respect to the USB hub 29, the USB controller 31 may be co-located with the hub in a separate module. Within the interface device 5, the USB controller 31 transmits and receives USB frames to a local central processing unit (CPU) 34 over a USB/CPU bus 32. Through these connections, according to the depicted embodiment, firmware for reconfiguring the interface device 5 can be downloaded to the server 20 at the host 2, then transmitted from the server to the USB hub 29, passed on from the USB hub 29 to the USB controller 31, which incorporates the firmware information in USB frames, and then transmitted from the USB controller to the CPU 34 of the interface device. The USB controller 31 is also coupled to a power unit 45 through a USB bus connection 46.

The interface device 5 is functionally divided into a control unit 30, that includes the CPU 34, and a media section 40. The control unit 30 includes a local memory unit 35 and a local timer unit 36 coupled to the CPU 34. The memory unit 35 is used to locally store the firmware that is sent to the CPU for reconfiguration purposes and any other data as required. The timer 36 can be used to generate local timing signals on an extremely rapid time scale (on the order of microseconds) to enable direct, immediate responses to be communicated from the interface device to field devices in accordance with a selected fieldbus protocol.

The firmware received by the CPU and stored in the memory unit 35 includes algorithms (engines) for communicating in the appropriate fieldbus protocol, and specifically includes the data link layer of the selected fieldbus network which provides, among other features, for media access to the communication channel (token passing, master/slave response) and data packet formation. Upon executing the engine for a new fieldbus network, the CPU 34 transmits a signal along a media selection bus 37 to a switch unit 41. According to one embodiment, the switch unit 41 is a multiplexer which selectively opens a channel to, or activates, one of several media units e.g., 42, 43, 44 and simultaneously turns off, or deactivates, the remaining media units. It is noted that in addition to, or instead of, a multiplexing circuit, the media section 40 may include analog and digital switches, programmable logic devices (PLDs), field programmable gate arrays (FPGAs), relays and/or other electronic elements as known in the art as components of selectively reconfigurable electronic circuitry. The switch unit 41 connects the CPU 34 to whichever of the media units 42, 43, 44 has been selected to a control bus 38 (which includes both a data and address bus) and also connects the selected media unit to the fieldbus network 10.

As shown, the media units include a Hart media unit 42, a Profibus media unit 43, and a Foundation Fieldbus unit 44. As discussed above, these three fieldbus platforms are the most predominant fieldbus platforms in current and projected use. However, the present invention is not necessarily limited for use with respect to these three platforms, and other media units can be incorporated to provide for communication with other fieldbus network platforms in accordance with the present invention.

Each media unit 42, 43, 44, provides a particular physical layer appropriate for the particular corresponding fieldbus network protocol. The physical layer in this context denotes both the physical conduit used to transmit signals between the interface device 5 and the devices 15 of the fieldbus network 10, such as RS 232 or RS 485 twisted pair cables, and also the signaling method employed and the various associated voltage and current levels used for signaling in the various media units. In this regard, the Hart media unit 42 includes circuitry for providing simultaneous analog and digital signaling and frequency shift key modulation for encoding. Notably, the Hart media unit 42 does not provide power to the field devices over the fieldbus network. The Profibus media unit 43 provides for two separate all-digital communication modes, Profibus DP and Profibus PA. Profibus DP operates at up to 500 kbits/s over an RS 485 twisted-pair wire that includes a balanced differential pair. Profibus PA operates on the standard IEC 1158-2 signaling on RS 232 twisted pair (4–20 mA) physical layer which operates at lower data rates but permits intrinsic safety and bus-powered devices.

The Foundation media unit 44, like Profibus PA, can operate using IEC 1158-2 signaling, but the Foundation media unit also offers a 31.25-kbps H1 bus option, as well as higher speed 1.0 and 2.5-Mbps options. The 31.25-kbps version uses a Manchester encoding scheme (±10 mA dc into 150 ohm load) that can use existing 4–20 mA twisted pair wiring. With an intrinsically safe IS barrier, the 31.25-kbps option supports intrinsic safety. The dc supply voltage ranges from 9 to 32 volts, but may be restricted to the barrier rating. Stubs or spurs are allowed, from 1 meter to 120 meters depending on the number of devices on the bus. Each H1 segment supports as many as 32 field devices with a maximum distance of 1900 m between devices. The 1.0 and 2.5-Mbps options both offer voltage mode signaling. The 1.0-Mbps option also allows current mode signaling. The voltage mode method delivers ±60 mA dc into a 75-Ohm equivalent load, while the current mode signaling method modulates the fieldbus signal on top of a 16-kHz ac power signal.

As noted above, the firmware engine associated with a given fieldbus network platform provides the corresponding data link layer for the selected media unit 42, 43, 44. For instance, for communication using the Profibus DP mode of media unit 43, a Profibus engine defines multi-master and multi-slave communication based on a real-time asynchronous bus principle, while for the Foundation media unit 44, a Foundation engine may provide for a centralized, deterministic token-passing mechanism using Foundation fieldbus H1 bus arbitration.

Power unit 45, which derives power from the USB bus connection 46, provides a voltage source for the CPU 34 and to the media units 42, 43, 44. Using appropriate switches and relays as known in the art, the power unit supplies power only to the selected media unit, and powers down the unselected or deselected media units. For example, if the interface device 5 is reconfigured from a Foundation fieldbus platform to a Profibus platform, the power unit 45 will turn off the power supply to the Foundation media unit 44 and switch on power to the Profibus media unit 43. Additionally, the turned off media units can be further electrically isolated from connection to the fieldbus network 10 by switches or gates. Depending on the signal supplied to the switch unit 41 from the CPU 34, the switch unit 41 can couple the power unit 45 to the fieldbus network 10 via controllable switch 46. This may occur, as explained above, when the Profibus 43 or Foundation fieldbus 44 media units and networks are employed, as for these networks, both power and data are transmitted along the fieldbus from central control devices to peripheral field devices.

Figure 3:
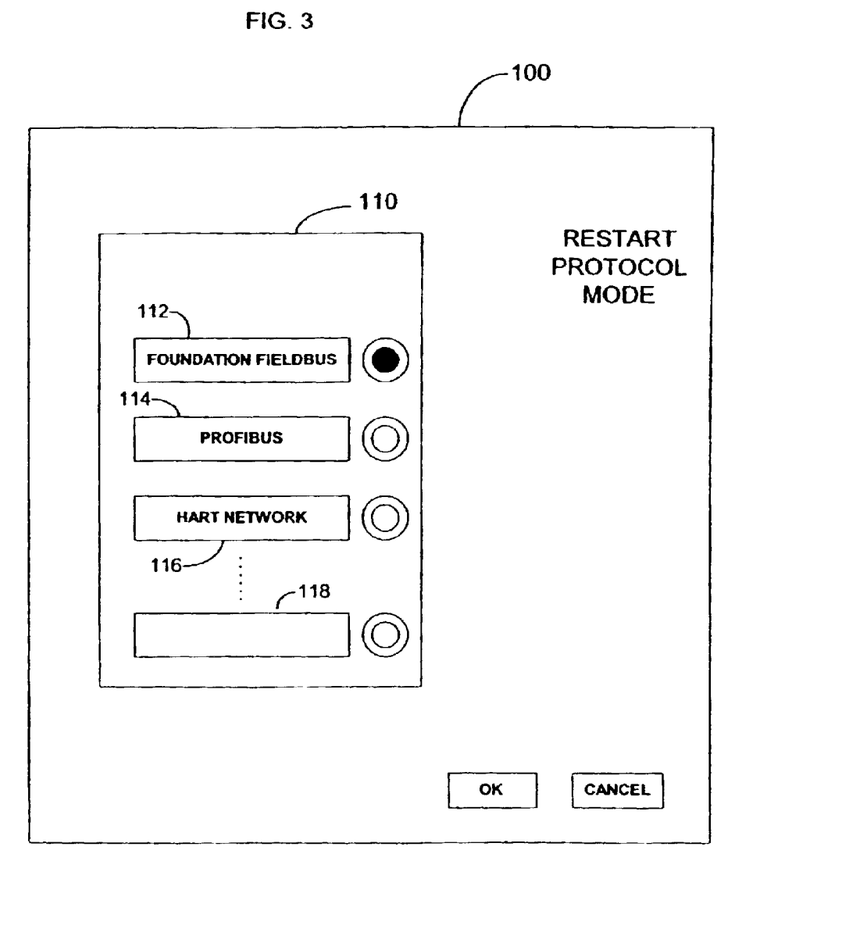
FIG. 3 is an exemplary embodiment of a graphical user interface screen that may be used by the client to initiate reconfiguration of an interface device according to the present invention.
Figure 4:
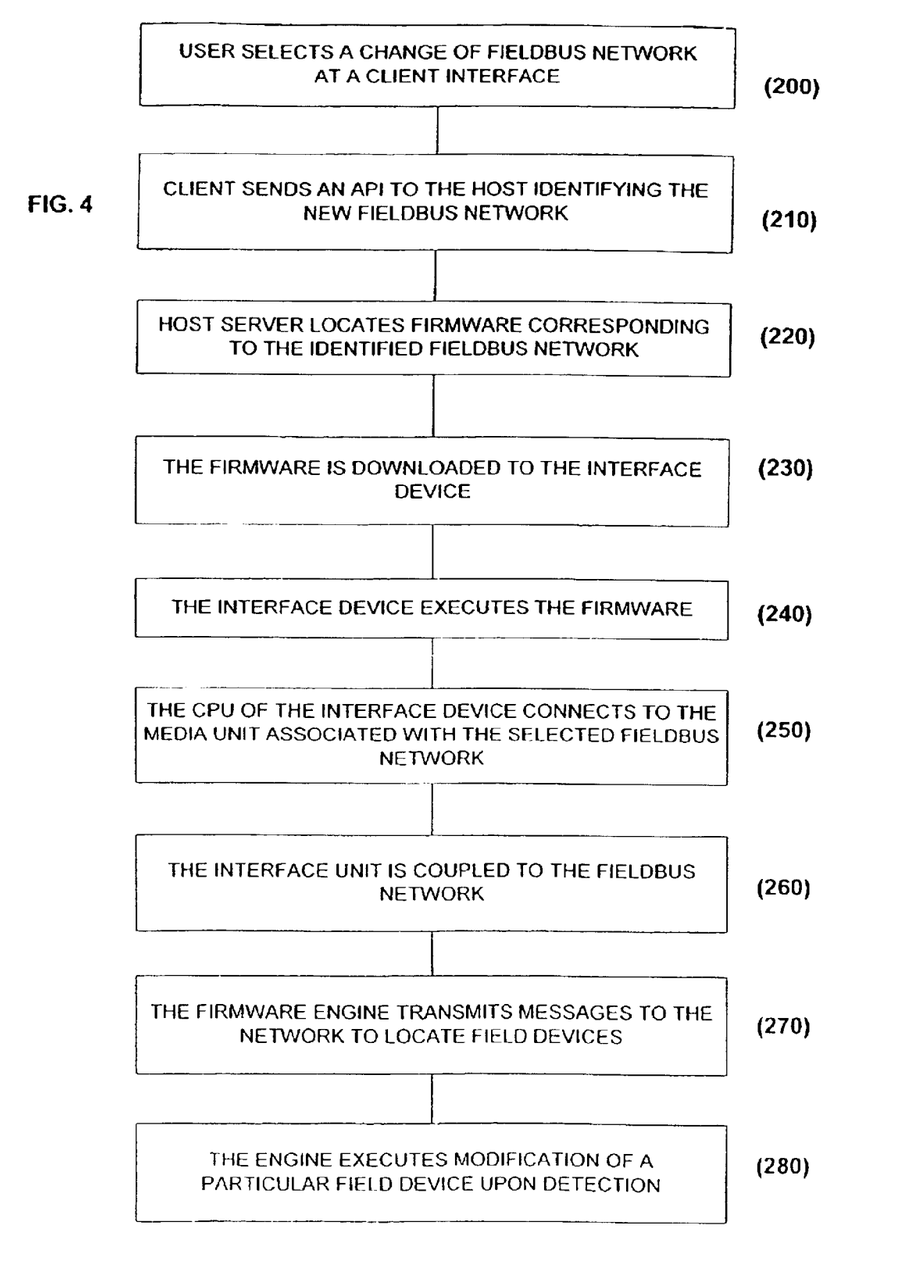
FIG. 4 is an exemplary flow chart of a method for configuring a reconfigurable interface device for communicating over a particular fieldbus network according to an embodiment of the present invention.

The following describes an exemplary interface reconfiguration process according to the present invention with reference to FIG. 4. At an initial stage, a process engineer (user) working at a client workstation may wish to change a parameter used by or stored at a field device that operates on a Profibus network. As shown in FIG. 3, the application program at the client may provide a user-friendly graphical interface 100 to facilitate reconfiguration including a screen or dialog box 110, which allows the user to select one of several fieldbus platform buttons 112, 114, 116, 118. As shown, Foundation Fieldbus is currently selected as shown by the darkened circle. By clicking on the Profibus button 114 and then clicking the 'OK' button (200), the user causes a parameter to be sent from the client to the host using an API called e.g., "ConnectToProfibus" (210) which identifies Profibus as the newly desired fieldbus network platform.

The host server receives the API parameter, then locates firmware associated with the Profibus protocol in its downloadable firmware database (220). The appropriate firmware is then downloaded to the interface device via a USB connection (230). Using the firmware, the CPU of the interface device executes a Profibus engine (240) and connects to the Profibus media unit (250). Simultaneously, the client application begins communicating with the host server using Profibus functions. At this stage or before, the interface device may be connected to a Profibus network (260). The Profibus engine sends out messages on the Profibus network to locate field devices (270), and upon detection (280) of the particular field device, the engine executes the function of changing the parameter used by the field device. The reconfiguration process can be similarly used for monitoring and extracting information from field devices on a specific fieldbus network.

A main advantage of the interface device and reconfiguration process according to the present invention is that a user can reconfigure the device in a plug-and-play manner by simply attaching the interface device to a fieldbus network and executing a command on a user interface screen for initiating reconfiguration of the device. Once the command is entered, an automatic reconfiguration process takes place that requires no further user intervention.

As can be clearly discerned, the present invention also provides several further advantages. The interface device incorporates hardware to accommodate several fieldbus protocols. It is therefore not necessary to exchange cables or interfaces to accommodate the different protocols. Since the USB protocol is included in nearly all computer architectures and operational systems, the interface device can be readily coupled with to most host server systems. Furthermore, use of the USB protocol between the host and interface is advantageous because USB is a plug-and-play protocol having high data transmission rates.

Additionally, all power for the interface device itself can be acquired from the USB bus, so the interface does not need to include batteries and external sources to supply its own power. Consequently, the physical structure of the interface device can be light and portable. Several devices can be plugged in series to the interface to create a fieldbus network over the USB bus.

In the foregoing description, the invention has been described with reference to a number of examples that are not to be considered limiting. Rather, it is to be understood and expected that variations in the principles of the interface device, fieldbus network interface assembly, and reconfiguration methods herein disclosed may be made by one skilled in the art and it is intended that such modifications, changes, and/or substitutions are to be included within the scope of the present invention as set forth in the appended claims.

What is claimed is:

1. A reconfigurable interface device for providing access to a plurality of fieldbus networks, comprising:
 a reconfigurable circuit, the circuit being reconfigurable to provide access to a selected fieldbus network from among a plurality of optional fieldbus networks, the reconfigurable circuit including:
  a plurality of media units, each media unit providing access to one of the plurality of optional fieldbus networks; and
  a switch unit coupled to each of the plurality of media units, the switch unit activating a media unit corresponding to the selected fieldbus network, and deactivating remaining media units.

2. The reconfigurable interface device of claim 1, wherein the switch unit includes a multiplexer.

3. The reconfigurable interface device of claim 1, wherein the reconfigurable circuit further includes:
 a microprocessor switchably coupled to each of the plurality of media units, the microprocessor adapted to receive and execute firmware having instructions for reconfiguring the microprocessor to enable communication over the selected fieldbus network.

4. The reconfigurable interface device of claim 3, further comprising:
 a USB controller coupled to the microprocessor and connectable via a USB bus to a host server, the USB controller receiving the firmware from the host server over the USB bus and delivering the received firmware to the microprocessor.

5. A reconfigurable interface device for providing access to a plurality of fieldbus networks, comprising:
 a reconfigurable circuit, the circuit being reconfigurable to provide access to a selected fieldbus network from among a plurality of optional fieldbus networks, the reconfigurable circuit including:
  a plurality of media units, each media unit providing access to one of the plurality of optional fieldbus networks; and
  a switch unit coupled to each of the plurality of media units, the switch unit activating a media unit corresponding to the selected fieldbus network, and deactivating remaining media units and
  a microprocessor switchably coupled to each of the plurality of media units, the microprocessor adapted to receive and execute firmware having instructions for reconfiguring the microprocessor to enable communication over the selected fieldbus network;
 a USB controller coupled to the microprocessor and connectable via a USB bus to a host server, the USB controller receiving the firmware from the host server over the USB bus and delivering the received firmware to the microprocessor; and
 a power unit coupled to the plurality of media units, the power unit providing power to the activated media unit, and shutting off power to the deactivated media units, the power unit being switchably connected to the selected fieldbus network for optionally providing power to the fieldbus network.

6. The reconfigurable interface device of claim 5, wherein the power unit is coupled to and receives power from the USB bus.

7. A reconfigurable interface device for providing access to a plurality of fieldbus networks, comprising:
 a reconfigurable circuit, the circuit being reconfigurable to provide access to a selected fieldbus network from among a plurality of optional fieldbus networks, the reconfigurable circuit including:
  a plurality of media units, each media unit providing access to one of the plurality of optional fieldbus networks; and
  a switch unit coupled to each of the plurality of media units, the switch unit activating a media unit corresponding to the selected fieldbus network, and deactivating remaining media units;
  a microprocessor switchably coupled to each of the plurality of media units, the microprocessor adapted to receive and execute firmware having instructions for reconfiguring the microprocessor to enable communication over the selected fieldbus network;
 a memory unit coupled to the microprocessor, the memory unit storing downloaded firmware; and
 a timer unit coupled to the microprocessor.

8. The reconfigurable interface device of claim 7, wherein the plurality of media units include:
 a Hart media unit for providing access to a Hart network;
 a Profibus media unit for providing access to a Profibus network; and
 a Foundation media unit for providing access to a Foundation fieldbus network.

9. A reconfigurable interface device for providing access to a plurality of fieldbus networks, comprising:
a reconfigurable circuit, the circuit being reconfigurable to provide access to a selected fieldbus network from among a plurality of optional fieldbus networks, the reconfigurable circuit including:
a plurality of media units, each media unit providing access to one of the plurality of optional fieldbus networks; and
a switch unit coupled to each of the plurality of media units, the switch unit activating a media unit corresponding to the selected fieldbus network, and deactivating remaining media units;
a microprocessor switchably coupled to each of the plurality of media units, the microprocessor adapted to receive and execute firmware having instructions for reconfiguring the microprocessor to enable communication over the selected fieldbus network;
wherein the plurality of media units each include a physical layer of a fieldbus network protocol stack corresponding to the fieldbus network for which each provides access.

10. A plug-and-play reconfigurable interface device for providing an interface between a host control device and a plurality of fieldbus networks, comprising:
a reconfigurable circuit, the circuit being reconfigurable to provide access to a selected fieldbus network from among several optional fieldbus networks, the circuit including a plurality of media units, each media unit providing access to one of the several optional fieldbus networks, the circuit further including a switch unit coupled to each of the plurality of media units for activating a media unit corresponding to the selected fieldbus network and deactivating remaining media units, and a microprocessor switchably coupled to the plurality of media units, the microprocessor adapted to receive from the host control device firmware having instructions for reconfiguring the microprocessor to enable communication over the selected fieldbus network.

11. The plug-and-play reconfigurable interface device of claim 10, further comprising:
a USB port, the USB port providing connectivity to the host control device via a USB bus.

12. A The plug-and-play reconfigurable interface device for providing an interface between a host control device and a plurality of fieldbus networks, further comprising:
a reconfigurable circuit, the circuit being reconfigurable to provide access to a selected fieldbus network from among several optional fieldbus networks, the circuit including a plurality of media units, each media unit providing access to one of the several optional fieldbus networks, the circuit further including a switch unit coupled to each of the plurality of media units for activating a media unit corresponding to the selected fieldbus network and deactivating remaining media units, and a microprocessor switchably coupled to the plurality of media units, the microprocessor adapted to receive from the host control device firmware having instructions for reconfiguring the microprocessor to enable communication over the selected fieldbus network;
a USB port, the USB port providing connectivity to the host control device via a USB bus; and
a power unit coupled to the plurality of media units, the power unit providing power to the activated media unit, and shutting off power to the deactivated media units, the power unit being switchably connected to the selected fieldbus network for optionally providing power to the fieldbus network;
wherein the power unit is coupled to and receives power from the USB bus.

13. A plug-and-play reconfigurable interface device for providing an interface between a host control device and a plurality of fieldbus networks, comprising:
a reconfigurable circuit, the circuit being reconfigurable to provide access to a selected fieldbus network from among several optional fieldbus networks, the circuit including a plurality of media units, each media unit providing access to one of the several optional fieldbus networks, the circuit further including a switch unit coupled to each of the plurality of media units for activating a media unit corresponding to the selected fieldbus network and deactivating remaining media units, and a microprocessor switchably coupled to the plurality of media units, the microprocessor adapted to receive from the host control device firmware having instructions for reconfiguring the microprocessor to enable communication over the selected fieldbus network;
a USB port, the USB port providing connectivity to the host control device via a USB bus,
wherein the plurality of media units include:
a Hart media unit for providing access to a Hart network,
a Profibus media unit for providing access to a Profibus network; and
a Foundation media unit for providing access to a Foundation fieldbus network.

14. A reconfigurable USB interface for providing access to a plurality of fieldbus networks, comprising:
a reconfigurable circuit, the circuit being reconfigurable to provide access to a selected fieldbus network from among several optional fieldbus networks; and
a USB port coupled to the reconfigurable circuit and to a USB bus, the USB port receiving selection and control information over the USB bus, and providing the selection and control information to the reconfigurable circuit.

15. The reconfigurable USB interface of claim 14, further comprising:
a USB controller coupled to the USB port, the USB controller receiving the selection and control information via the USB port as USB frames, and converting the USB frames into machine-readable information.

16. The reconfigurable USB interface of claim 15, wherein the reconfigurable circuit includes:
a plurality of media units, each media unit providing access to one of the several optional fieldbus networks; and
a switch unit coupled to each of the plurality of media units, the switch unit activating a media unit corresponding to the selected fieldbus network, and deactivating remaining media units.

17. The reconfigurable USB interface of claim 16, wherein the reconfigurable circuit further includes:
a microprocessor switchably coupled to each of the plurality of media units and coupled to the USB controller;
wherein the USB controller receives firmware instructions for reconfiguring the microprocessor to enable communication over the selected fieldbus network via the USB port, and delivers the firmware instructions to the microprocessor.

18. The reconfigurable USB interface of claim 16, wherein the plurality of media units include:
   a Hart media unit for providing access to a Hart network,
   a Profibus media unit for providing access to a Profibus network; and
   a Foundation media unit for providing access to a Foundation fieldbus network.

19. The reconfigurable USB interface of claim 16, further comprising:
   a power unit coupled to the plurality of media units, the power unit providing power to the activated media unit, and shutting off power to the deactivated media units, the power unit being switchably connected to the selected fieldbus network for optionally providing power to the fieldbus network;
   wherein the power unit is coupled to and receives power from the USB bus.

20. A reconfigurable control device for controlling and monitoring a plurality of fieldbus networks, comprising:
   a host, the host including a server and non-volatile memory; and
   a reconfigurable interface device coupled to the host for providing access to a plurality of fieldbus networks, the reconfigurable interface including a reconfigurable circuit, the circuit being reconfigurable to provide access to a fieldbus network selected by the host from among several optional fieldbus networks;
   wherein the reconfigurable circuit includes a plurality of media units, each media unit providing access to one of the several optional fieldbus networks and a switch unit coupled to each of the plurality of media units, the switch unit activating a media unit corresponding to the selected fieldbus network, and deactivating remaining media units;
   wherein the non-volatile memory stores firmwares for reconfiguring the reconfigurable circuit in accordance with each of the several optional fieldbus networks.

21. The reconfigurable control device of claim 20, wherein the host includes a USB network hub, and the interface device includes a USB controller, the USB network hub being coupled to the USB controller via a USB bus.

22. The reconfigurable control device of claim 20, wherein the reconfigurable circuit of the interface device includes a microprocessor switchably coupled to each of the plurality of media units and coupled to the USB controller; and
   wherein the microprocessor receives firmware instructions downloaded from the host memory for reconfiguring the microprocessor to enable communication over the selected fieldbus network, and delivers the firmware instructions to the microprocessor.

23. A reconfigurable control device for controlling and monitoring a plurality of fieldbus networks, comprising:
   a host, the host including a server and non-volatile memory and a USB network hub; and
   a reconfigurable interface device coupled to the host for providing access to a plurality of fieldbus networks, the reconfigurable interface including a reconfigurable circuit, the circuit being reconfigurable to provide access to a fieldbus network selected by the host from among several optional fieldbus networks;
   wherein the non-volatile memory stores firmwares for reconfiguring the reconfigurable circuit in accordance with each of the several optional fieldbus networks;
   wherein the interface device includes:
   a USB controller coupled to the USB network hub via a USB bus;
   a plurality of media units, each media unit providing access to one of the several optional fieldbus networks;
   a switch unit coupled to each of the plurality of media units, the switch unit activating a media unit corresponding to the selected fieldbus network, and deactivating remaining media units; and
   a power unit coupled to the plurality of media units, the power unit providing power to the activated media unit, and shutting off power to the deactivated media units, the power unit being switchably connected to the selected fieldbus network for optionally providing power to the fieldbus network;
   wherein the power unit is coupled to and receives power from the USB bus.

24. A reconfigurable system for controlling and monitoring a fieldbus network, comprising:
   a client device including a microprocessor, the client device executing application software for selecting a fieldbus network for control and monitoring operations;
   a host including a server and non-volatile memory, the host server providing an application program interface to the client device and communicating instructions and data to the client through the application program interface; and
   a reconfigurable interface device providing access to a plurality of fieldbus networks and coupled to the host, the interface device being reconfigurable to provide access to the selected fieldbus network from among several optional fieldbus networks, the reconfigurable interface device including a plurality of media units, each media unit providing access to one of the several optional fieldbus networks and a switch unit coupled to each of the plurality of media units, the switch unit activating a media unit corresponding to the selected fieldbus network, and deactivating remaining media units.

25. The reconfigurable system of claim 24, wherein the non-volatile memory at the host stores firmwares for reconfiguring the interface device to operate using a protocol corresponding to the optional fieldbus networks, and upon receiving an instruction from the client indicating a selected fieldbus network, the host server downloads a firmware corresponding to the selected fieldbus network and delivers the downloaded firmware to the interface device for reconfiguration.

26. The recoafigurable system of claim 25, wherein the host includes a USB network hub, and the interface device includes a USB controller, the USB network hub being coupled to the USB controller via a USB bus.

27. A reconfigurable system for controlling and monitoring a fieldbus network, comprising:
   a client device including a microprocessor, the client device executing application software for selecting a fieldbus network for control and monitoring operations;
   a host including a server, non-volatile memory and a USB network hub, the host server providing an application program interface to the client device and communicating instructions and data to the client through the application program interface; and
   a reconfigurable interface device including a USB controller, the interface providing access to a plurality of fieldbus networks and coupled to the host, the interface device being reconfigurable to provide access to the selected fieldbus network from among several optional fieldbus networks;

a power unit coupled to the plurality of media units, the power unit providing power to the activated media unit, and shutting off power to the deactivated media units, the power unit being switchably connected to the selected fieldbus network for optionally providing power to the fieldbus network;

wherein the non-volatile memory at the host stores firmwares for reconfiguring the interface device to operate using a protocol corresponding to the optional fieldbus networks, and upon receiving an instruction from the client indicating a selected fieldbus network, the host server downloads a firmware corresponding to the selected fieldbus network and delivers the downloaded firmware to the interface device for reconfiguration and wherein the USB network hub is coupled to the USB controller via a USB bus and the power unit is coupled to and receives power from the USB bus.

28. A method for enabling communication with field devices on a selected fieldbus network using a reconfigurable interface device, the method comprising:

selecting a fieldbus network, among a plurality of optional fieldbus networks for communication; and reconfiguring the interface device to provide access to the selected fieldbus network;

wherein the reconfiguration of the interface device includes activating a media unit corresponding to the selected fieldbus network.

29. The method of claim 28, further comprising:

downloading firmware including instructions for communicating over the selected network to the interface device.

30. The method of claim 29, further comprising:

providing selection instructions and firmware to the interface device over a USB network bus.

31. A method for enabling communication with field devices on a selected fieldbus network using a reconfigurable interface device, comprising:

selecting a fieldbus network, among a plurality of optional fieldbus networks for communication;

reconfiguring the interface device to provide access to the selected fieldbus network;

downloading firmware including instructions for communicating over the selected network to the interface device;

providing selection instructions and firmware to the interface device over a USB network bus; and depending on the selected fieldbus network, providing power to field devices from the interface device.

32. The method of claim 31, further comprising:

obtaining the power provided to the field devices from the USB network bus.

33. A method for enabling communication with field devices on a selected fieldbus network using a reconfigurable interface device, comprising:

selecting a fieldbus network, among a plurality of optional fieldbus networks for communication; and reconfiguring the interface device to provide access to the selected fieldbus network downloading firmware including instructions for communicating over the selected network to the interface device; and reconfiguring the interface device to provide access to one of a Hart network, a Profibus network, and a Foundation fieldbus network.

34. A method for enabling communication with field devices on a selected fieldbus network using a reconfigurable interface device, comprising:

selecting a fieldbus network, among a plurality of optional fieldbus networks for communication; and reconfiguring the interface device to provide access to the selected fieldbus network downloading firmware including instructions for communicating over the selected network to the interface device;

providing a plurality of media units in the interface device, each media unit providing access to one of the optional fieldbus networks;

activating the media unit corresponding to the selected fieldbus network; and deactivating remaining media units.

35. A reconfigurable interface device for providing access to a plurality of fieldbus networks, comprising:

reconfigurable processing unit;

a plurality of media units, each media unit including a preset circuit providing access to one of the plurality of optional fieldbus networks; and a switch unit coupled to each of the plurality of media units, the switch unit activating a media unit corresponding to a selected fieldbus network, and deactivating remaining media units depending on instructions received from the processing unit.

* * * * *

UNITED STATES PATENT AND TRADEMARK OFFICE
CERTIFICATE OF CORRECTION

PATENT NO. : 6,839,790 B2
DATED : January 4, 2005
INVENTOR(S) : De Almeida et al.

It is certified that error appears in the above-identified patent and that said Letters Patent is hereby corrected as shown below:

Column 12,
Line 49, change "recoafigurable" to -- reconfigurable --.

Signed and Sealed this

Sixteenth Day of August, 2005

JON W. DUDAS
*Director of the United States Patent and Trademark Office*